Sept. 26, 1967 D. SCHIMSKY 3,344,319
ELECTRONIC COMPARATOR
Filed April 30, 1965
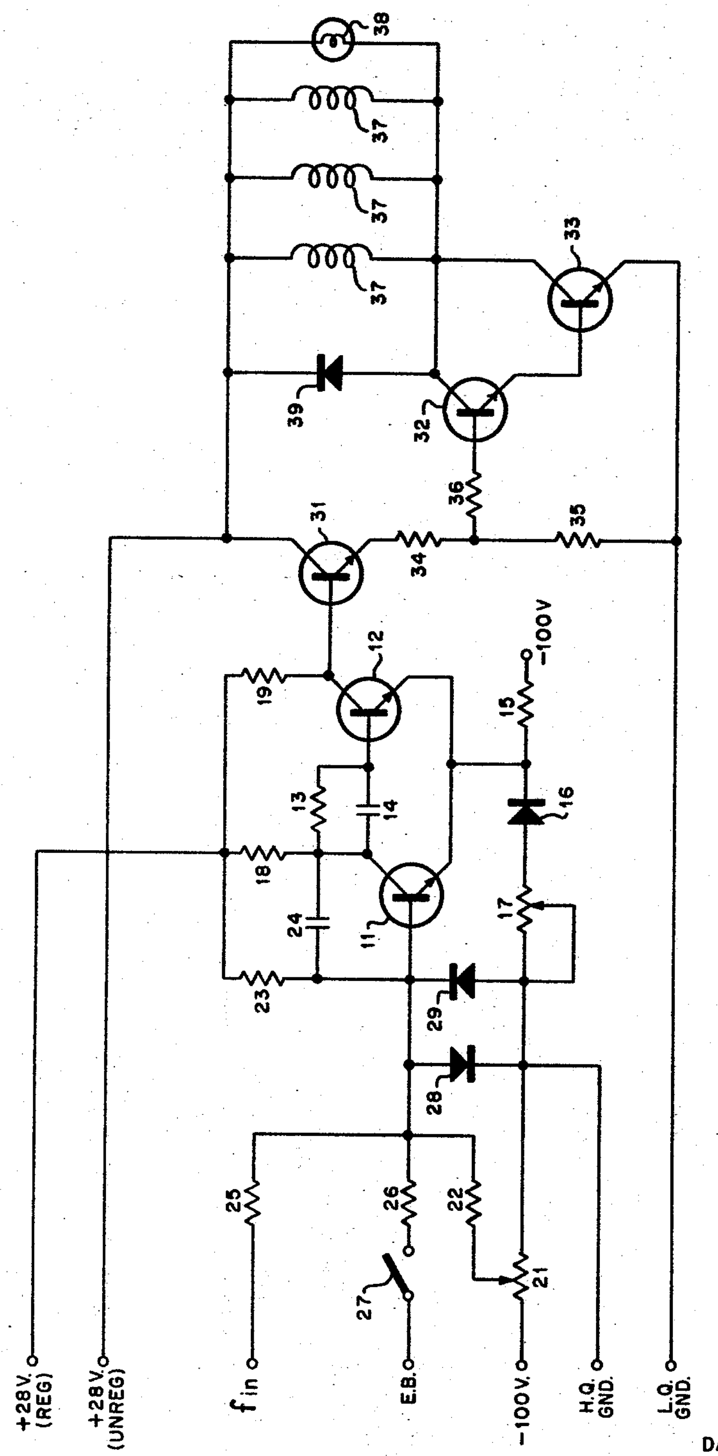
INVENTOR.
DAVID SCHIMSKY
BY Henry Hansen
William C. Everett
ATTORNEYS 3,344,319
ELECTRONIC COMPARATOR David Schimsky, Willingboro, N.J., assignor to the United States of America as represented by the Secretary of the Navy Filed Apr. 30, 1965, Ser. No. 452,406
8 Claims. (Cl. 317—148.5)

The invention described herein may be manufactured and used by or for the Government of the United States of America for governmental purposes without the payment of any royalties thereon or therefor.

The present invention relates to voltage comparators and more particularly to a voltage comparator used in an analog computer with a variable control on the hysteresis of the comparator.

In the field of voltage comparators it has been the general practice to employ Schmidt triggers which are regenerative multivibrators. These circuits have two states, one of which is the normal state in the absence of an input signal, and when the input signal reaches a predetermined level the circuit will switch to the opposing state. It is necessary to reduce the input voltage somewhat below the input switching voltage in order to switch the circuit back to the first state. This difference between the switching on and the switching off voltage is called hysteresis, and it is generally desired to reduce it to the lowest level possible. It is not desirable, however, to reduce it entirely to zero, since the circuit will then be extremely sensitive to noise in the input signal and will have "chatter." About 10 millivolts is considered optimum. It is desired to provide means in a voltage comparator such as a Schmidt trigger for controlling the hysteresis at a predetermined low amount and to vary that hysteresis over a significant range.

The general purpose of this invention is to provide a voltage comparator having a controllable hysteresis ranging between 1 millivolt and 2 volts for operating relays in an analog computer. To attain this, the invention provides a variable feedback in the emitter-to-ground circuit of the comparator, which controls the amount of regeneration and thereby the amount of hysteresis in the comparator. The emitter-to-ground circuit also contains a forward biased diode of the same material as the transistors of the comparator which provides temperature compensation for the comparator since the characteristics will change by the same amount for a given temperature change. The invention also provides a plurality of inputs and biases which enable the comparator to be used in a wide selection of modes according to the desired use.

An object of the present invention is to provide a voltage comparator having a variable hysteresis controllable within wide limits and down to a very low value.

Another object is to provide a voltage comparator which is temperature compensated to provide substantially uniform operation over a wide range of temperatures.

A further object of the invention is to provide a voltage comparator in an analog computer which is usable in a number of different modes.

Other objects and many of the attendant advantages of this invention will be readily appreciated as the same becomes better understood by reference to the following detailed description when considered in connection with the accompanying drawing wherein:

The figure shows a circuit diagram of the voltage comparator according to the invention.

In the figure there are shown two transistors 11, 12 forming the gain sections of the voltage comparator. The collector of transistor 11 is connected through a resistance 13 and capacitance 14 in parallel to the base of transistor 12. The emitters of both transistors 11 and 12 are tied together and are connected through a resistance

15 to a $-100$ volt source and through a diode 16 and variable resistance 17 to ground. Transistor 11 has a collector load 18 and transistor 12 has a collector load 19 both being attached together to a regulated 28-volt source. Means for regulating the 28-volt source are well known in the art and therefore are not shown. The ground to which the emitters of transistors 11 and 12 are connected through resistance 17 and diode 16 is a high quality ground, which is free of any contaminated signal, which may generally be found at the negative terminal of the regulated 28-volt source. To provide biasing means to the base of transistor 11 there is connected between the high quality ground and a $-100$ volt source a variable resistance 21 having a tap on it leading through the resistance 22 to the base of transistor 11. There is also provided to the base of transistor 11 a connection to the 28-volt regulated source through a resistance 23. The base of transistor 11 is also linked to the collector thereof through a capacitance 24. There are provided two inputs, an $f_{in}$ input through a resistance 25, and an E.B. input through a resistance 26 and switch 27. The E.B. input is for external bias. Switch 27 is shown in its normally open position, wherein the internal bias through resistances 21 and 22 is used. Diodes 28 and 29 limit the voltage swings on the base of transistor 11 to approximately one volt plus or minus.

The output of the comparator is taken from the collector of transistor 12 to an amplifier circuit comprising transistors 31, 32 and 33. Transistor 31 is connected in an emitter follower configuration between a 28-volt unregulated source and a low quality ground through two resistances 34 and 35. The low quality ground may be found at the negative terminal of the unregulated 28-volt source. A resistance 36 connects the signal from transistor 31 to the base of transistor 32 which is connected in a Darlington configuration with transistor 33. The collectors of transistors 32 and 33 are connected to a set of relays 37 and a light 38, which lights when the relays 37 are in operation. Diode 39 absorbs back voltage surges which may be caused by the operation of the relays 37. It will be understood that the high quality and low quality grounds are linked together by a high resistance, not shown, which prevents contamination of the high quality ground but provides a linkage between the two sections of the comparator.

The operation of the comparator may be seen by reference to the conditions of transistors 11 and 12. Normally transistor 12 is conducting fully and transistor 11 is off. This causes a sizable current to be fed through resistances 18 and 13 into the base of transistor 12 to hold it conducting at saturation. There will be substantially zero voltage therefore at the base of transistor 31 and the relays 37 as well as the light 38 will be off. When a current of sufficient size is applied into the base of transistor 11 it will begin to conduct. This lowers the voltage on its collector thereby decreasing the current into the base of transistor 12. As transistor 12 comes out of saturation, the current through it decreases, more than compensating for the rise of current through transistor 11 because of the gain factor through transistor 12. This net decrease of current is reflected by an increase of negative voltage on the cathode of diode 16. This will cause transistor 11 to be forward biased more than it was at the start, which will increase the current passing through it, which will decrease further the current into the base of transistor 12, thus producing a regenerative effect. In a very short time transistor 11 is in saturation and transistor 12 is cut off. This produces a high current into the base of transistor 31, which is amplified by transistors 31, 32, and 33 to switch relays 37 and light 38 on. When the signal on the base of transistor 11 is decreased, it must be decreased to some level below the voltage at which it turned on due to the fact that the voltage on the emitters of transistors 11 and 12 is now more negative. The amount of this voltage shift is the hysteresis and is caused by the shift of voltage across resistance 17 and diode 16. Since resistance 15 is in the neighborhood of 15K the −100 volt source provides an essentially constant current source forward biasing diode 16. Variable resistance 17 may be varied between zero and 100 ohms, and the resistance of diode 16, forward biased at about 6 milliamperes, is something less than 100 ohms, providing a wide variation of the hysteresis voltage from approximately 1 millivolt up to 2 volts. When variable resistance 17 is at zero, the hysteresis is at its lowest.

The resistance of diode 16, which is made of the same material as transistor 11, varies in the same manner as the base-to-emitter resistance of transistor 11 with temperature. It will be seen, therefore, that the operating point of the comparator will not shift with temperature. Diode 16 is directed to be forward biased with respect to current flow, which, because of the −100 volt source, is in a direction opposite to that of transistors 11 and 12.

The voltage drop through resistances 17 and diode 16 forward bias transistor 11 almost to the point of conduction. In addition, the 28-volt regulated source through resistance 23 provides enough in extra current that transistor 11 is just on the verge of conduction, so that when bias resistance 21 is set at zero, transistor 11 will conduct, and when bias resistance 21 is set at 0.1 volt transistor 11 will cut off at the lowest hysteresis level. At higher hysteresis levels the relays will cut off at slightly higher bias settings.

There are a number of different nodes in which the comparator can be used. The first and most common is the internal or fixed bias mode. In this mode switch 27 is left open as shown. The voltage at which the comparator is to operate is supplied at $f_{in}$. This voltage must be positive and must come from a low impedance source such as an operational amplifier. One then advances the variable resistance 21 from 0 until indicator light 38 just goes out. Then one very slowly backs off resistance 21 until the light just comes on. Resistance 21 may then be locked in position by any known means. The signal to be tested is then applied at $f_{in}$ and the comparator is set for the fixed bias mode. In this mode the comparator may be used to generate a "dead zone" function for an analog computer.

The second mode widely used is the external or variable bias mode. For this mode, switch 27 is closed. Resistance 21 is run back to zero with $f_{in}$ and E.B. open the light should be on. One advances resistance 21 until the light just goes out, which should be at a very low voltage. Very slowly one backs off resistance 21 until the light comes on again. Lock resistance 21 in place. At this point, if a negative voltage is applied to E.B. and a positive voltage is applied to $f_{in}$ the relays will operate when $f_{in}$ is more positive than the voltage on E.B. is negative. This mode may be used for any one of a number of purposes. For one thing it may be used simply to test two voltages which are opposite in phase. For another thing, it may be used to compare the phases of two voltages if each voltage is fed into the $f_{in}$ of one comparator and the outputs through the relays are subtracted the one from the other.

Two other modes may be created by applying a voltage through a high impedance, not shown, at the E.B. point. Resistance 21 is set at a low voltage sufficient to turn the relays off with switch 27 open. No signal is applied at $f_{in}$ but the relays may be activated simply by closing switch 27. Another mode also using the voltage source with the high impedance, not shown, is a ground switching mode in which switch 27 is left closed. The relays will be energized until a ground appears at the E.B. point to ground the high impedance voltage, at which point the relays will be shut off.

The transistors shown are the PNP type. Obviously, the invention will work equally well with NPN transistors, in which event all the polarities must be switched, and the comparator will test negative signals.

Obviously many modifications and variations of the present invention are possible in the light of the above teachings. It is therefore to be understood that within the scope of the appended claims the invention may be practiced otherwise than as specifically described.

What is claimed is:

1. An electronic voltage comparator comprising:
   a first transistor;
   a second transistor having its base linked to the collector of said first transistor;
   a pair of load resistances linked to the collectors of said transistors, both of said pair being connected to a voltage source; and
   a feedback resistance linked between the emitters of both said transistors and ground, said feedback resistance being variable, said feedback resistance causing regenerative switching of said second transistor from a conducting to a non-conducting state upon a signal of a first predetermined level at the base of said first transistor and regenerative switching of said second transistor from said non-conducting state to said conducting state upon decrease of said signal to a second predetermined level, the difference between said first and second levels being determined by said variable feedback resistance.

2. An electronic voltage comparator as recited in claim 1 further comprising:
   a diode of the same material as said transistors, in series with said feedback resistance, said diode being forward biased in the direction of net current flow through said feedback resistance.

3. An electronic voltage comparator as recited in claim 1 wherein said feedback resistance is biased to have a net current flow in the direction opposite that of said transistors.

4. An electronic voltage comparator as recited in claim 3 further comprising:
   a diode of the same material as said transistors, in series with said feedback resistance, said diode being forward biased in the direction of net current flow.

5. An electronic voltage comparator as recited in claim 1 further comprising:
   an RC parallel coupling between the collector of said first transistor and the base of said second transistor.

6. An electronic voltage comparator as recited in claim 1 further comprising:
   variable bias means at the base of said first transistor, of polarity opposite to that of said signal, whereby said signal must be greater in magnitude than said bias to cause switching of said second transistor from said conducting state to said non-conducting state.

7. An electronic voltage comparator as recited in claim 1 further comprising:
   means to apply an external bias at the base of said first transistor, of polarity opposite to that of said signal, whereby said signal must be greater in magnitude than said external bias to cause switching of said second transistor from said conducting state to said non-conducting state.

8. An electronic voltage comparator as recited in claim 1 further comprising:
   an amplifier connected to the collector of said second transistor; and
   a relay connected to said amplifier, whereby said relay is closed when said second transistor is in its non-conducting state.

No references cited.

MILTON O. HIRSHFIELD, *Primary Examiner.*

J. A. SILVERMAN, *Assistant Examiner.*